United States Patent
Chen et al.

(10) Patent No.: US 7,007,372 B1
(45) Date of Patent: Mar. 7, 2006

(54) METHOD FOR MAKING HIGH SPEED, HIGH AREAL DENSITY INDUCTIVE WRITE STRUCTURE

(75) Inventors: Yingjian Chen, Fremont, CA (US); Hua-Ching Tong, San Jose, CA (US); Lei Wang, Fremont, CA (US); Xizeng Shi, Fremont, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 0 days.

(21) Appl. No.: 10/656,311

(22) Filed: Sep. 5, 2003

Related U.S. Application Data (62) Division of application No. 09/617,791, filed on Jul. 18, 2000, now Pat. No. 6,618,223.

(51) Int. Cl.
*G11B 5/127* (2006.01)
*H04R 31/00* (2006.01)

(52) U.S. Cl. ............................ 29/603.13; 29/603.07; 29/603.11; 29/603.16; 29/603.18; 29/605; 29/606; 360/121; 360/122; 360/126; 360/317; 427/127; 427/128; 216/65; 205/119; 205/122; 204/192.15; 451/5; 451/41

(58) Field of Classification Search ............ 29/603.07, 29/603.11, 603.13–603.16, 603.18, 605, 606; 360/121–126, 317; 427/127, 128; 216/65; 204/192.15; 205/119, 122; 451/5, 41
See application file for complete search history.

(56) References Cited

U.S. PATENT DOCUMENTS 5,843,521 A * 12/1998 Ju et al. ...................... 428/336
5,901,431 A * 5/1999 Santini ..................... 29/603.14
6,108,167 A 8/2000 Tateyama et al.
6,198,609 B1 * 3/2001 Barr et al. ................... 360/322
6,233,116 B1 * 5/2001 Chen et al. .................. 360/126
6,317,290 B1 * 11/2001 Wang et al. ................. 360/126
6,430,806 B1 * 8/2002 Chen et al. ............... 29/603.07

FOREIGN PATENT DOCUMENTS

JP 08111011 A * 4/1996

OTHER PUBLICATIONS

"Electrochemical corrosion study of high moment thin film head materials"; Gangopadhyay, S.; Inturi, V.R.; Barnard, J.A.; Parker, M.R.; Saffarian, H.M.; Warren, G.W.; Magnetics, IEEE Transactions on, vol.: 30, Issue: 6, Nov. 1994; pp. 3918 3920.*

* cited by examiner

*Primary Examiner*—Paul D Kim
(74) *Attorney, Agent, or Firm*—Haynes Beffel & Wolfeld LLP; Johnathan E. Prejean, Esq.

(57) ABSTRACT

An inductive write element is disclosed for use in a magnetic data recording system. The write element provides increased data rate and data density capabilities through improved magnetic flux flow through the element. The write element includes a magnetic yoke constructed of first and second magnetic poles. The first pole includes a pedestal constructed of a high magnetic moment (high $B_{sat}$) material, which is preferably FeRhN nanocrystalline films with lamination layers of CoZrCr. The second pole includes a thin inner layer of high $B_{sat}$ material (also preferably FeRhN nanocrystalline films with lamination layers of CoZrCr), the remainder being constructed of a magnetic material capable of being electroplated, such as a Ni—Fe alloy. An electrically conductive coil passes through the yoke between the first and second poles to induce a magnetic flux in the yoke when an electrical current is caused to flow through the coil. Magnetic flux in the yoke produces a fringing field at a write gap whereby a signal can be imparted onto a magnetic medium passing thereby.

20 Claims, 5 Drawing Sheets

METHOD FOR MAKING HIGH SPEED, HIGH AREAL DENSITY INDUCTIVE WRITE STRUCTURE

CROSS-REFERENCE TO RELATED APPLICATIONS

This application is a Divisional of U.S. application Ser. No. 09/617,791, filed Jul. 18, 2000, now U.S. Pat. No. 6,618,223, Sep. 9, 2003, which is hereby incorporated by reference in its entirety.

FIELD OF THE INVENTION

The present invention relates to magnetic data recording and more specifically to a method for making a high data rate, high data density inductive writer.

BACKGROUND OF TH INVENTION

Figure 1A:
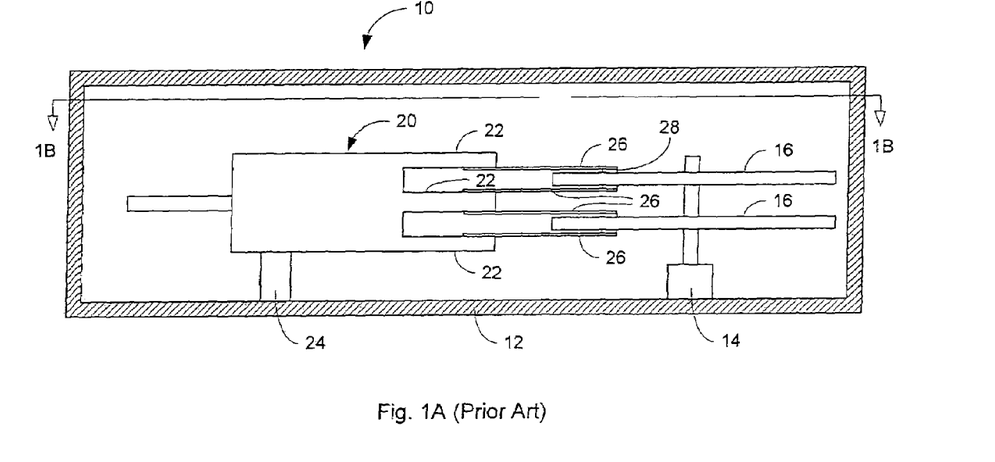
FIG. 1A is a partial cross-sectional front elevation view of a magnetic data storage system of the background art.
Figure 1B:
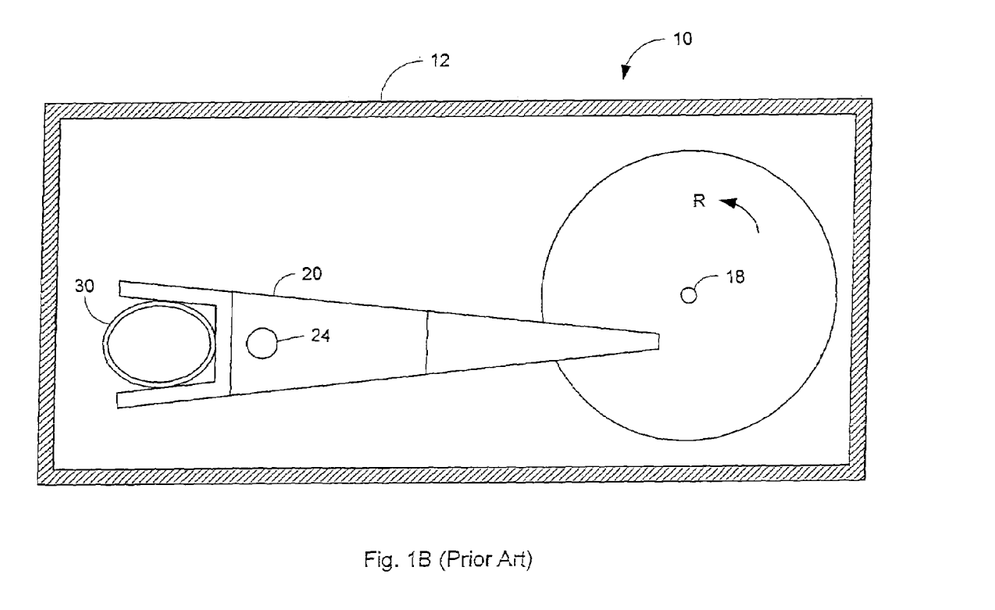
FIG. 1B is a top plan view taken along line 1B—1B of FIG. 1A.

Magnetic disk drives are used to store and retrieve data for digital electronic apparatus such as computers. In FIGS. 1A and 1B, a magnetic disk data storage system 10 of the prior art includes a sealed enclosure 12, a disk drive motor 14, one or more magnetic disks 16, supported for rotation by a drive spindle 18 of motor 14, and an actuator 20 including at least one arm 22, the actuator being attached to a pivot bearing 24. Suspensions 26 are coupled to the ends of the arms 22, and each suspension supports at its distal end a read/write head or transducer 28. The head (which will be described in greater detail with reference to FIGS. 2A and 2B) typically includes an inductive write element with a sensor read element. As the motor 14 rotates the magnetic disk 16, as indicated by the arrow R, an air bearing is formed under the transducer 28 causing it to lift slightly off of the surface of the magnetic disk 16, or, as its is termed in the art, to "fly" above the magnetic disk 16. Alternatively, some transducers, known as contact heads, ride on the disk surface. Various magnetic "tracks" of information can be written to and/or read from the magnetic disk 16 as the actuator 20 causes the transducer 28 to pivot in a short arc across a surface of the disk 16. The pivotal position of the actuator 20 is controlled by a voice coil 30 which passes between a set of magnets (not shown) to be driven by magnetic forces caused by current flowing through the coil 30.

Figure 2A:
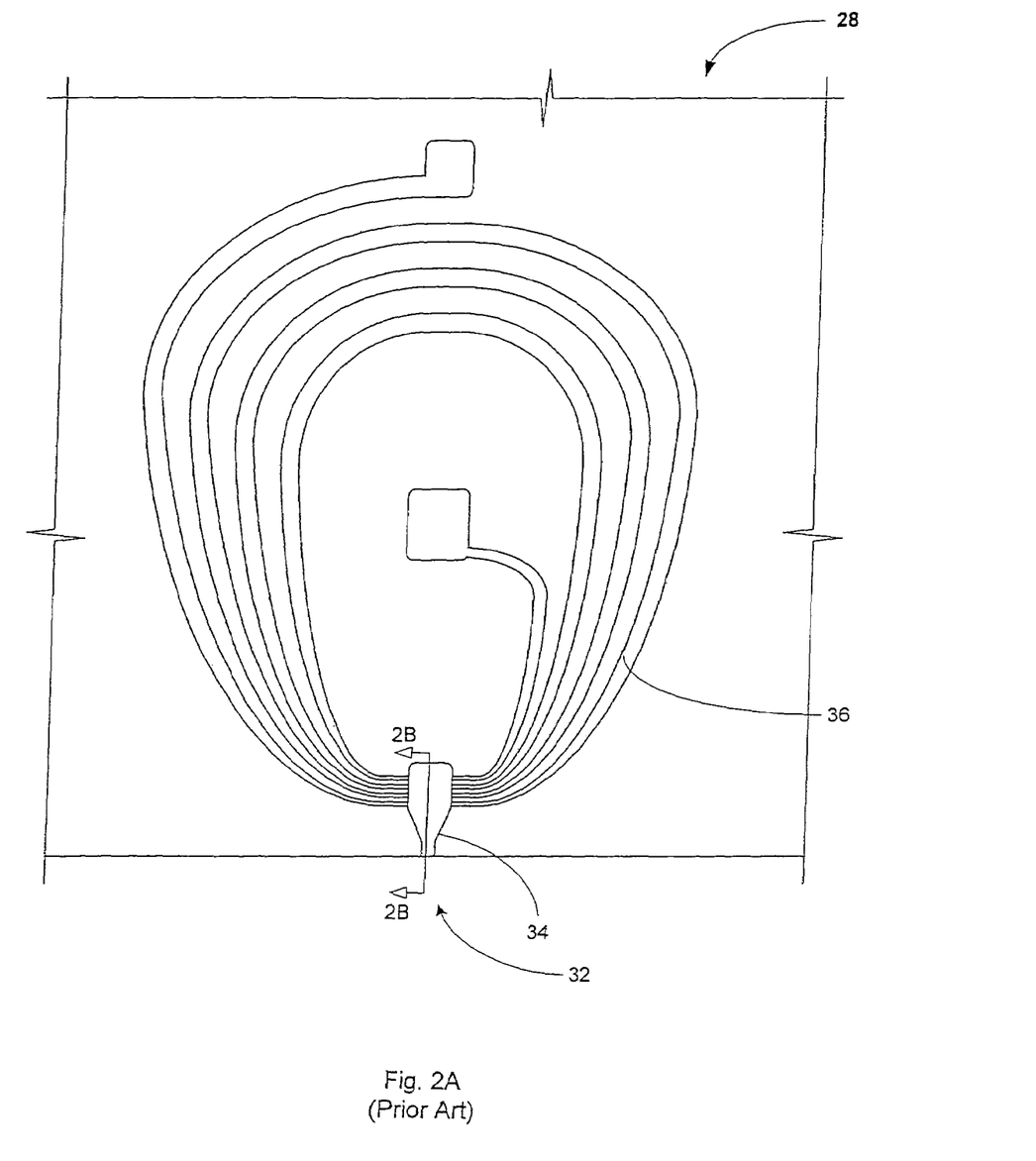
FIG. 2A is a is a plan view of a portion of a read/write head, shown greatly enlarged.

FIG. 2A shows the distal end of the head 28, greatly enlarged so that a write element 32 incorporated into the head can be seen. The write element 32 includes a magnetic yoke 34 having an electrically conductive coil 36 passing therethrough.

Figure 2B:
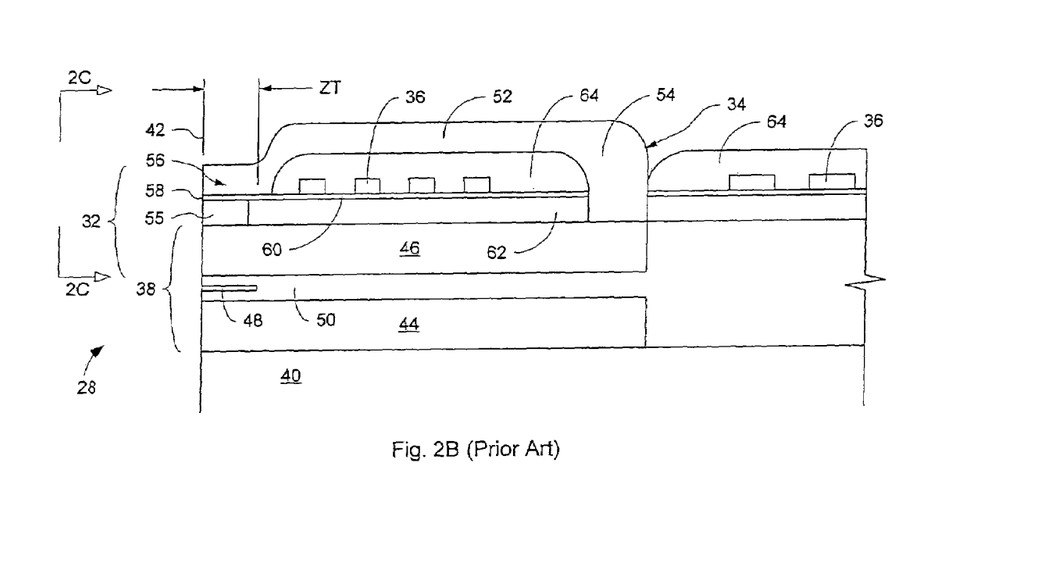
FIG. 2B is a view taken from line 2B—2B of FIG. 2A, shown enlarged.

The write element 32 can be better understood with reference to FIG. 2B, which shows the write element 32 and an integral read element 38 in cross section. The head 28 includes a substrate 40 above which the read element 38 and the write element 32 are disposed. A common edge of the read and write elements 38, 32, defines an air bearing surface ABS, in a plane 42, which can be aligned to face the surface of the magnetic disk 16 (see FIGS. 1A and 1B). The read element 38 includes a first shield 44, a second shield 46, and a read sensor 48 that is located within a dielectric medium 50 between the first shield 44 and the second shield 46. The most common type of read sensor 48 used in the read/write head 28 is the magnetoresistive (AMR or GMR) sensor, which is used to detect magnetic field signal changes in a magnetic medium by means of changes in the resistance of the read sensor imparted from the changing magnitude and direction of the magnetic field being sensed.

The write element 32 can be better understood with reference to FIG. 2B, which shows the write element 32 and an integral read element 38 in cross section. The head 28 includes a substrate 40 above which the read element 38 and the write element 32 are disposed. A common edge of the read and write elements 38, 32, defines an air bearing surface ABS, in a plane 42, which can be aligned to face the surface of the magnetic disk 16 (see FIGS. 1A and 1B). The read element 38 includes a first shield 44, a second shield 46, and a read sensor 48 that is located within a dielectric medium 50 between the first shield 44 and the second shield 46. The most common type of read sensor 48 used in the read/write head 28 is the magnetoresistive (AMR or GMR) sensor, which is used to detect magnetic field signal changes in a magnetic medium by means of changes in the resistance of the read sensor imparted from the changing magnitude and direction of the magnetic field being sensed.

The write element 32 is typically an inductive write element that includes the second shield 46 (which functions as a first pole for the write element) and a second pole 52 disposed above the first pole 46. Since the present invention focuses on the write element 32, the second shield/first pole 46 will hereafter be referred to as the "first pole". The first pole 46 and the second pole 52 contact one another at a backgap portion 54, with these three elements collectively forming the yoke 34. The combination of a first pole tip portion and a second pole tip portion near the ABS are sometimes referred to as the ABS end 56 of the write element 32. Some write elements have included a pedestal 55 which can be used to help define track width and throat height. A write gap 58 is formed between the first and second poles 46 and 52 in the area opposite the back gap portion 54. The write gap 58 is filled with a non-magnetic, electrically insulating material that forms a write gap material layer 60. This non-magnetic material can be either integral with or separate from a first insulation layer 62 that lies upon the first pole 46 and extends from the ABS end 56 to the backgap portion 54. The conductive coil 36, shown in cross section, passes through the yoke 34, sitting upon the write gap material 60. A second insulation layer 64 covers the coil and electrically insulates it from the second pole 52.

An inductive write head such as that shown in FIGS. 2A and 2B operates by passing a writing current through the conductive coil 36. Because of the magnetic properties of the yoke 28, a magnetic flux is induced in the first and second poles 46 and 52 by write currents passed through the coil 36. The write gap 58 allows the magnetic flux to fringe out from the yoke 34 (thus forming a fringing gap field) and to cross the magnetic recording medium that is placed near the ABS.

Figure 2C:
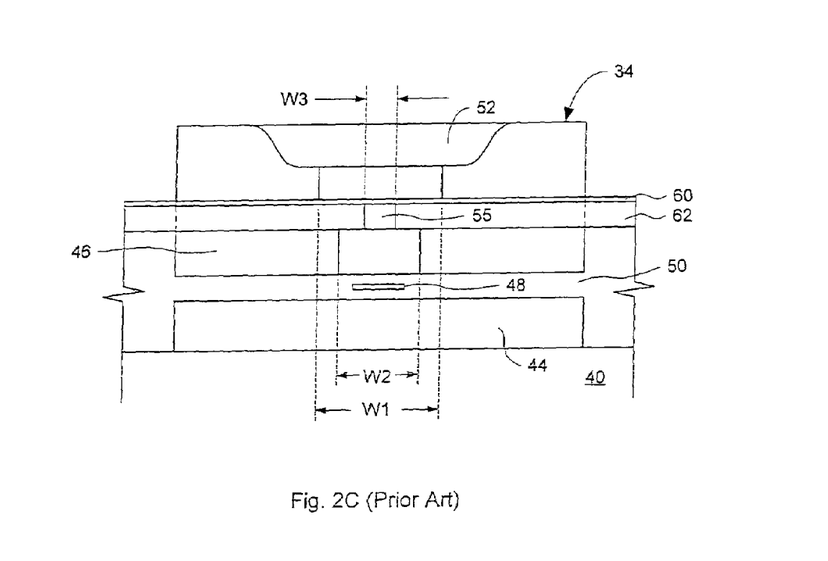
FIG. 2C is a view taken from line 2C—2C of FIG. 2B.

With reference to FIG. 2C, a critical parameter of a magnetic write element is the trackwidth of the write element, which defines track density. For example, a narrower trackwidth can result in a higher magnetic recording density. The trackwidth is defined by the geometries in the ABS end 56 of the yoke. For example, the track width can be defined by the width W3 of the pedestal 55 or by the width W1 of the second pole 52, depending upon which is smaller. The widths W3 and W1 can be the same, such as when the second pole 52 is used to trim the pedestal 55. Alternatively, in designs that have no pedestal at all it would be possible to define the trackwidth by the width W2 of the first pole.

With reference to FIG. 2B, the fringing gap field of the write element can be further affected by the positioning of the zero throat level ZT. ZT is defined as the distance from the ABS to the first divergence between the first and second pole, and it can be defined by either the first or second pole 46, 52 depending upon which has the shorter pole tip portion. Pedestal defined zero throat is defined by the back edge of the pedestal and is accomplished by moving the second insulation layer 64 back away from the ABS. Alternatively, zero throat can be defined by the geometry of the second pole 52, by allowing the second insulation layer 64 to extend over the top of the pedestal. In order to prevent flux leakage from the second pole 52 into the back portions of the first pole 46, it is desirable to provide a zero throat level that is well defined with respect to the plane of the ABS. Furthermore, a pedestal defined zero throat is beneficially defined along a well defined plane that is parallel with the plane 42 of the ABS, whereas a zero throat defined by the second pole occurs along the sloped edge of the second insulation layer 64. As will be appreciated upon a reading of the description of the invention, the present invention can be used with either pedestal defined zero throat or a second pole defined zero throat. Thus, accurate definition of the trackwidth, and zero throat is critical during the fabrication of the write element.

The performance of the write element is further dependent upon the properties of the magnetic materials used in fabricating the poles of the write element. In order to achieve greater overwrite performance, magnetic materials having a high saturation magnetic flux density (high $B_{sat}$) are preferred. A common material employed in forming the poles is high Fe content (55% Fe) NiFe alloy having a $B_{sat}$ of about 16 kG. However, high Fe content NiFe alloy has a high magnetostriction constant $\lambda s$ (on the order of $10^{-5}$) which causes undesirable domain formation in the poles. It is known that the domain wall motion in the writer is directly related to the increase in popcorn noise in the read element, especially when the motion occurs in the first pole, which also serves as a shield for the read element. A reduction in popcorn noise in the read element can be achieved through the use of soft magnetic materials, (i.e. materials having a low magnetostriction constant) in the fabrication of the first pole 46. However, such materials generally have limited $B_{sat}$.

Therefore, there remains a need for a write element having the ability to concentrate a high degree of magnetic flux in the ABS end of the write element, while minimizing or eliminating popcorn noise caused by magnetostrictive properties of the write element. Such a write element would preferably provide a narrow and accurately controlled trackwidth as well as providing high overwrite, low non-linear transition shift, a high areal density and high data rate.

SUMMARY OF THE INVENTION

The present invention provides an inductive write element having improved magnetic performance characteristics, including high overwrite, low non-linear transition shift, high areal density and high data rate. The write element includes first and second poles, each constructed of a magnetic material and joined to one another to form a magnetic yoke. The poles are joined to one another at one end to form a back gap region, the other end having a write gap defined between the poles. An electrically conductive coil passes through the yoke between the first and second pole, and insulating material electrically isolates the electrically conductive coil from the magnetic yoke. The second pole includes a layer of a laminated high magnetic moment material, sputter deposited as a sheet film across the inner surface of the pole adjacent to the insulation material and write gap.

The present invention provides an inductive write element having improved magnetic performance characteristics, including high overwrite, low non-linear transition shift, high areal density and high data rate. The write element includes first and second poles, each constructed of a magnetic material and joined to one another to form a magnetic yoke. The poles are joined to one another at one end to form a back gap region, the other end having a write gap defined between the poles. An electrically conductive coil passes through the yoke between the first and second poles, and insulating material electrically isolates the electrically conductive coil from the magnetic yoke. The second pole includes a layer of a laminated high magnetic moment material, sputter deposited as a sheet film across the inner surface of the pole adjacent to the insulation material and write gap.

Forming only the inner portion of the second pole of high magnetic moment material and the remainder of a material such as NiFe advantageously allows the write element to be formed using currently available manufacturing techniques. Currently available high magnetic moment materials cannot be deposited by electroplating and are generally sputter deposited. By first sputter depositing the high magnetic moment material and then plating the remainder of the second pole with the lower magnetic moment material, the plated portion of the pole can be used as a mask to etch the sputtered material to provide the desired second pole configuration.

In an embodiment of the invention, the first pole can include a pedestal formed of the laminated high magnetic moment material, sputter deposited as a sheet film. Such a pedestal would be formed in the region of the write gap and would beneficially concentrate magnetic flux in the desired portion of the write gap. As an aspect of the invention, the high magnetic moment material used in the first and second poles can be FeXN, where X is a material selected from the group consisting of Rh, Ta, Al, Ti and Zr. The high magnetic moment material can additionally be laminated with layers of a dielectric film which more preferably can be a cobalt based amorphous ferro-magnetic material, and most preferably is $CO_{90}Zr_9Cr$. $CO_{90}Zr_9Cr$ has been found to improve anisotropic properties. Such laminated materials can preferably include layers of high magnetic moment materials on the order of 500 Angstroms thick, interspersed with lamination layers of cobalt based amorphous ferro-magnetic material or alternatively of a non-magnetic material in layers that are roughly 50 Angstroms thick.

These and other advantages of the present invention will become apparent to those skilled in the art upon a reading of the following descriptions of the invention and a study of the several figures of the drawings.

BRIEF DESCRIPTION OF THE FIGURES

The present invention will be readily understood by the following detailed description in conjunction with the accompanying drawings, with like reference numerals designating like elements.

DETAILED DESCRIPTION OF PREFERRED EMBODIMENTS

Figure 3:
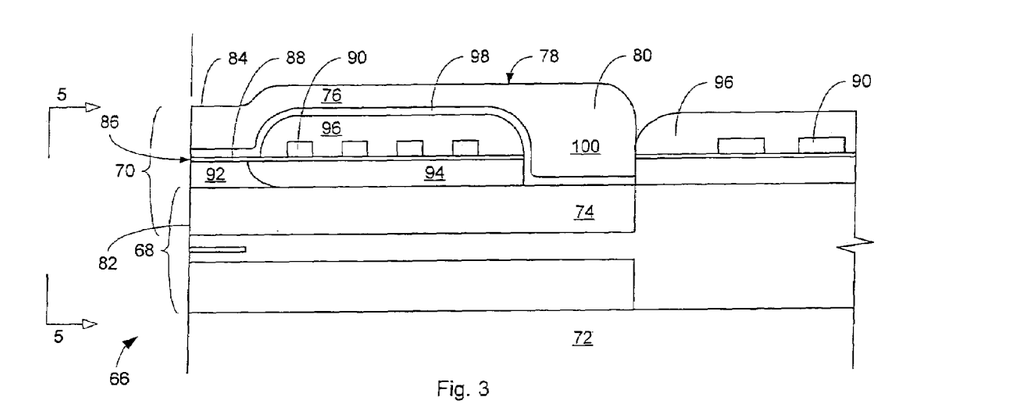
FIG. 3 is a view similar to FIG. 2B showing a read/write head of the present invention in cross section.

With reference to FIG. 3 the present invention is embodied in a merged read/write head 66 including a read element 68 and an integral write element 70, both of which are built upon a substrate 72. The read element 68 having been described with reference to the background of the invention, the present description will focus on the write element 70, which embodies the subject matter of the present invention.

The write element 70 includes first and second poles 74, 76, which together join to form a magnetic yoke 78. The poles 74, 76 join at one end to form a back-gap 80, and are separated from one another everywhere else. Opposite the back-gap, each pole 74, 76 terminates in a pole tip 82, 84. Opposite the back gap 80, the poles 74, 76 are separated by a write gap 88. A layer of dielectric write gap material 89 fills the write gap and extends beyond the write gap into the interior of the yoke 78. An electrically conductive coil 90 passes through the yoke 78 sitting atop the write gap material layer 89.

With continued reference to FIG. 3, the first pole 74 is constructed of a magnetic material having soft magnetic properties (i.e. low magnetostriction), preferably permalloy. Such soft magnetic properties are necessary to avoid domain boundary movement and associated popcorn noise in the read element 68. The first pole 74 includes a pedestal 92, disposed opposite the back-gap 80. The pedestal is constructed of a high magnetic moment material and functions to concentrate magnetic flux. While plated high magnetic moment materials do not generally exhibit soft magnetic properties, the pedestal is located far enough away from the read element 68 and is sufficiently small in size as compared with the rest of the first pole 74 so as to not generate undesirable popcorn noise. To further improve performance, the pedestal is preferably constructed of FeXN nanocrystalline films with lamination layers of CoZrCr, which has been found to exhibit excellent magnetic properties including high magnetic moment and relatively low magnetostriction. The FeXN and the lamination layers are preferably sputter deposited onto a flat wafer that has been planarized using by chemical mechanical polishing (CMP).

With continued reference to FIG. 3, a first insulation layer 94 covers the first pole, having a smooth flat upper surface that is flush with the smooth flat upper surface of the pedestal 92. While this first insulation layer can be of many suitable materials having a high electrical resistance it is preferably constructed of $Al_2O_3$.

With reference still to FIG. 3, the write gap material layer 89 sits atop the smooth coplanar surfaces of the first insulation layer 94 and the pedestal 92. The write gap material layer is preferably constructed of $Al_2O_3$ or alternatively of $SiO_2$. The coil 90 sits atop the write gap material layer 89 and is also covered by a second insulation layer 96, which insulates the coil 90 from the second pole 76 as well as insulating the winds of the coil 90 from one another. The second insulation layer has smoothly rounded edges formed by a curing process that will be described in greater detail below.

With continued reference to FIG. 3, the second pole 76 includes a high magnetic moment layer 98. The remainder of the second pole 76 consists of a secondary layer 100, constructed of a magnetic material such as plated Ni—Fe alloy, which can be readily electroplated and which exhibits good corrosion resistance. The high magnetic moment material layer 98, which is preferably constructed of laminated FeXN nanocrystalline films with lamination layers of $CO_{90}Zr_9Cr$, improves performance of the head by facilitating magnetic flux flow through the second pole 76, thereby resulting in a stronger fringing field at the write gap. The secondary layer 100, which preferably makes up the bulk of the second pole 76, provides a mask for etching the high magnetic moment material layer 98 as will be described in greater detail below. In order to minimize apex reflection during the photolithography process used to define the top pole, it is desirable that the edge of the coil insulation layer 96 be placed further from the ABS than the pedestal edge, in which case the zero throat is defined by the pedestal. Apex reflection is a major source of trackwidth variation during the fabrication of the top pole. By moving the coil insulation layer 96 away from the ABS and plating the second pole 76 onto a flat surface in the area near the ABS, the trackwidth can be more easily controlled. The high magnetic moment layer 98 is preferably on the order of 1 to a few times the thickness of the write gap 88. In one embodiment the high magnetic moment layer 98 is roughly 0.5 um thick while the remainder of the second pole 76 is roughly 2 um thick and the pedestal is roughly 1 um thick. The throat height is preferably 3–10 times the thickness of the write gap 88.

In an alternate embodiment of the invention, not shown, the second pole includes a layer of laminated high magnetic moment material as discussed above, but the first pole includes no pedestal. In another embodiment, the first pole includes a pedestal constructed of laminated high magnetic moment material, but the second pole does not include a laminated high magnetic moment layer. Such a construction could be useful where magnetic flux saturation is a problem. For example, if saturation were experienced in the pedestal of the first pole, then removing the high magnetic moment material from the second pole would decrease flux flow through the second pole, thereby preventing saturation at the pedestal. Similarly, when saturation is experienced in the second pole, the design having a high magnetic moment layer in the second pole and no pedestal on the first pole would promote flux flow through the second pole while limiting flux flow through the first pole, thereby preventing saturation in the second pole.

In still another embodiment of the invention, the high magnetic moment layer 98 of the second pole 76 can be constructed of laminated FeXN nanocrystalline films with lamination layers of cobalt based amorphous ferro-magnetic alloy or alternatively of a non-magnetic dielectric material, while the pedestal is constructed of some other material such as a Ni—Fe alloy that can be electro-plated. Alternatively, the pedestal can be constructed of FeXN nanocrystalline films with lamination layers of a cobalt based amorphous ferromagnetic alloy or of a non-magnetic dielectric material, while the high magnetic moment layer of the second pole is some other plated high magnetic moment material such as NiFe55.

Figure 4:
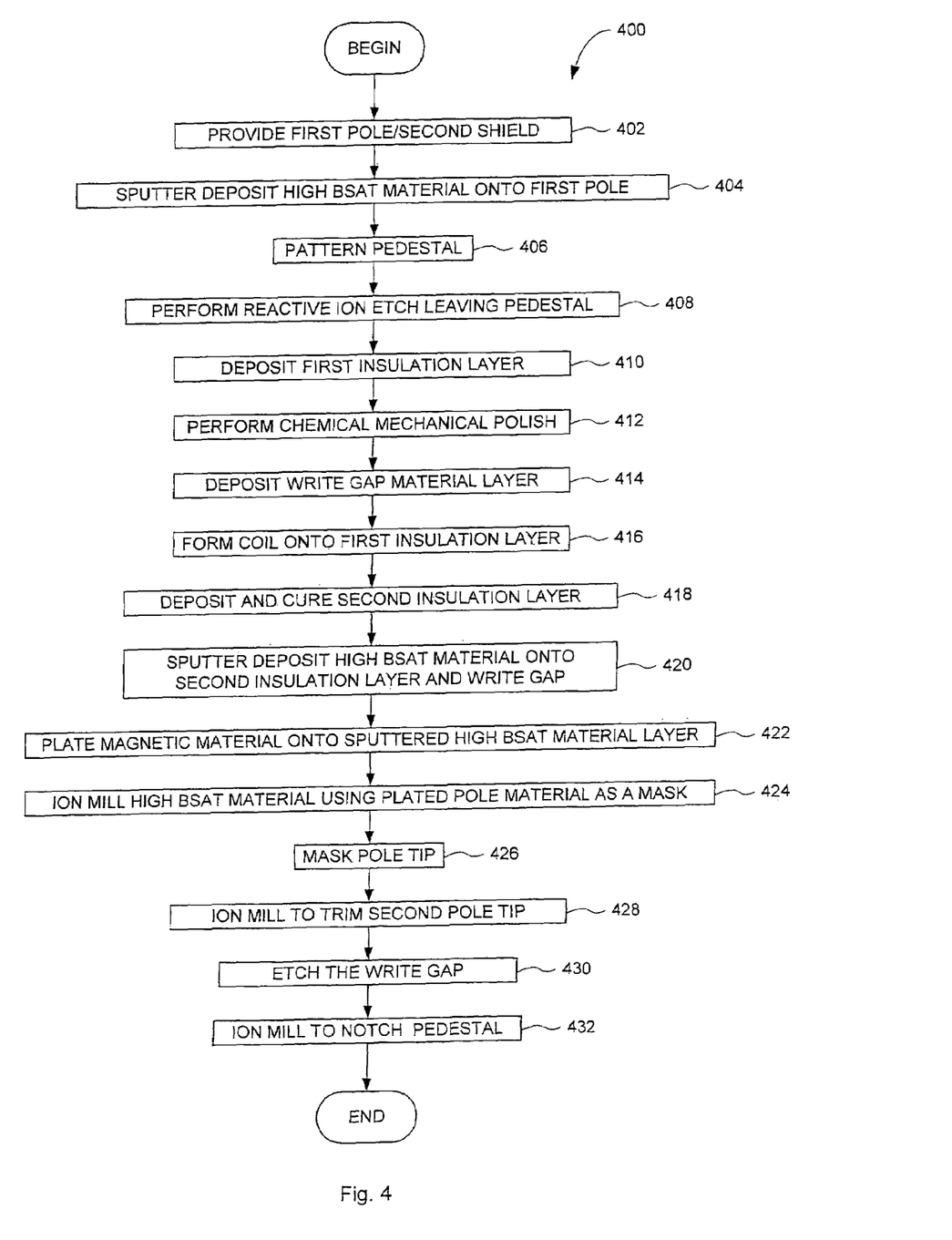
FIG. 4 is a flowchart illustrating a process for constructing a write element embodying the present invention.

With reference now to FIG. 4, a process 400 is provided for constructing a write element of the present invention. The process begins with a step 402 of constructing the first pole 74. The first pole is preferably constructed by patterning and electroplating permalloy according to lithographic techniques familiar to those skilled in the art, and then is planarized by a chemical mechanical polishing process. Then, in a step 404 a layer of high magnetic moment (high $B_{sat}$) material is sputter deposited onto the first pole. This sputtering process results in a layer of high $B_{sat}$ material that completely covers the first pole as well as surrounding structure. Thereafter, in a step 406 the pedestal is patterned. A layer of photoresist is deposited so as to form a mask covering the area where the pedestal is to be formed. Then, in step 408, ion milling is performed to the sputtered high $B_{sat}$ material not covered by the photoresist mask, thus forming the pedestal 92. The ion milling step leaves a tail of sputtered material tapering from the edge of the pedestal 92.

With further reference to FIG. 4, in a step 410 a first insulation layer 94 is deposited onto the first pole. This first insulation layer 94 is preferably constructed of $Al_2O_3$ and is deposited sufficiently thick to at least reach the thickness of the pedestal 92 and is preferably slightly thicker than the pedestal 92. Thereafter, in a step 412 a chemical mechanical polishing step is performed to planarize the first insulation layer 94, generating a flat planar surface across the first insulation layer 94 and the top of the pedestal 92. In a step 414 the write gap material layer 89 is deposited onto the smooth planar surface of the first insulation layer 94 and the pedestal 92. The write gap material layer can be constructed of many suitable dielectric substances, but is preferably constructed of $Al_2O_3$ or alternatively of $SiO_2$.

In a step 416, the electrically conductive coil 90 is formed. The coil is preferably constructed of copper and is formed by methods that are familiar to those skilled in the art. These methods involve first depositing a seed layer of copper or some other suitable conductive material. The coil is then patterned and electroplated, and the seed layer removed by an etching process. With the coil thus formed, in a step 418 the second insulation layer 96 is formed. The second insulation layer is preferably constructed of a photoresist, which is spun onto the write gap material 89 and the coil 90. The photoresist is patterned and exposed so that selective portions of the photoresist can be removed to provide vias for the back gap and the coil leads. Then the photorsist photoresist is cured by exposure to high temperatures, hardening the photoresist and providing it with smoothly rounded edges. In order to improve properties of the sputtered layer, a thin layer of dielectric material can be added to the top of the photoresist material.

With reference still to FIG. 4, the formation of the second pole will now be described. In a step 420, a thin layer of high $B_{sat}$ material is sputter deposited onto the structure. As will be appreciated by those skilled in the art, sputter deposition will cover the entire exposed structure, including the second insulation layer 96 and the write gap material layer 89. The high $B_{sat}$ material is preferably constructed of FeRhN nanocrystalline films with lamination layers of CoZrCr, however other high $B_{sat}$ at materials can also be used. Then, in a step 422 the remainder of the second pole 76 is deposited. This step involves forming a mask and then electroplating the second pole. Using such standard electroplating and photolithographic processes, the electroplated portion of the second pole 76 can be formed with the desired shape. The electroplated portion of the first pole is preferably constructed of a NiFe alloy suitable for electroplating. With the electroplated portion of the second pole acting as a mask, in a step 424 an etching process is conducted to remove the high $B_{sat}$ material that is not covered by the plated portion of the second pole 76. This effectively results in a desired second pole 76 being primarily constructed of a magnetic material such as permalloy, and having a high $B_{sat}$ inner layer. The resulting pole structure includes a tail (not shown) of high $B_{sat}$ material that extends outward slightly from the edge of the pole 76, beyond the edge of the plated portion. Also, as previously discussed the ion milling step leaves some of the sputtered material re-deposited on the sidewalls of the second pole 76.

With continued reference to FIG. 4, in a step 426, the pole tip of the second pole 76 is masked with photoresist. Then, in a step 428 the structure is again ion milled to remove material from the uncovered side portions of the tip of the second pole 76. Thereafter, in a step 430 an etching process is performed to remove write gap material in the pole tip region at the sides of the second pole 76. Then, with the write gap material locally removed, in a step 432, yet another ion mill is performed to remove material from the corners of the pedestal 92 leaving notches 102 in the pedestal 92, which can be more clearly seen with reference to FIG. 5, which shows an ABS view of the resulting pole trimmed pedestal. The notches 102 in the pedestal prevent magnetic flux from flowing through the sides of the yoke, thereby preventing side writing.

As will be appreciated by those skilled in the art, the above process can be slightly modified to construct one of the earlier described alternate embodiments of the invention. For example, the write element 70 could be constructed without the pedestal by patterning the first insulation layer to terminate short of the ABS plane 86 and eliminating the pedestal deposition process. In such a case the write gap material layer would simply slope down along the edge of the first insulation layer, and would sit atop the first pole 74 in the region of the write gap. Alternatively, the write element 70 could be constructed with a pedestal 92 as described above, but with a second pole formed without a laminated high $B_{sat}$ layer. Furthermore, high $B_{sat}$ layer of the second pole can be constructed of FeRhN nanocrystalline films with lamination layers of CoZrCr while the pedestal is constructed of some other magnetic material. Similarly, the pedestal can be constructed of FeRhN nanocrystalline films with lamination layers of CoZrCr while the high $B_{sat}$ layer of the second pole is constructed of plated high $B_{sat}$ material such as NiFe55.

Figure 5:
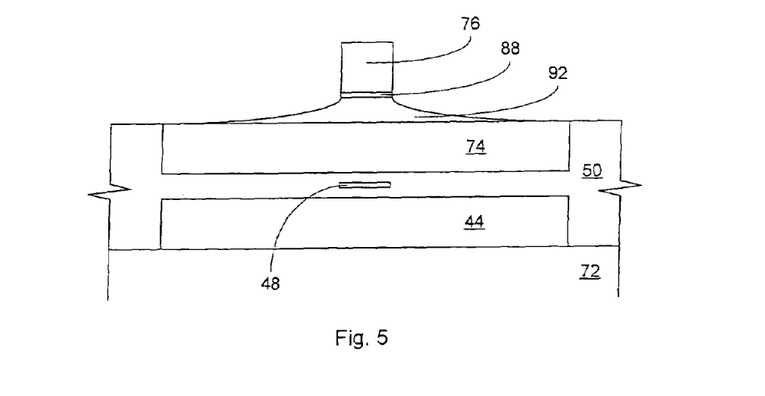
FIG. 5 is a view taken from line 5—5 of FIG. 3.

With reference now to FIG. 5, in an alternate embodiment of the invention, the pedestal can be constructed very thin with a tapered edge. Making the pedestal thin advantageously simplifies the manufacturing process, and the tapered edge promotes flux flow into the pedestal, avoiding magnetic saturation in the pedestal. A method for constructing a write element having such pedestal is described in U.S. patent application Ser. No. 09/602,536, titled "INDUCTIVE WRITE HEAD INCORPORATING A THIN HIGH MOMENT PEDESTAL", filed on 23 Jun. 2000, the entirety of which is incorporated herein by reference.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited in scope only as specified in the appended claims.

The invention claimed is:

1. A method for constructing an inductive write structure for use in a magnetic data recording system, comprising:
    forming a first magnetic pole of a magnetic material;
    depositing a first insulation layer;
    depositing a layer of dielectric write gap material;
    forming an electrically conductive coil;
    depositing a second insulation layer:
    curing said second insulation layer;

forming a thin layer of high magnetic moment material, by sputter depositing a lamina of FeXN, X being selected from the group of materials consisting of Rh, Ta, Al, Ti, and Zr, and sputter depositing a lamina of a cobalt based ferromagnetic amorphous alloy;

masking the thin layer of high magnetic moment material in a pattern corresponding to a second pole;

plating a magnetic material in the pattern of said second pole;

performing a first ion milling process, to remove at least a portion of the sputtered, high magnetic moment material not covered by the plated second pole; and after forming the first magnetic pole:

forming a layer of a high magnetic moment material by sputter depositing onto said first pole;

masking the high magnetic moment material formed onto the first pole in a pattern corresponding to a pedestal to be formed on an end of the first pole; and etching to remove said sputter deposited high magnetic moment material not covered by said mask to form said pedestal;

wherein forming the layer of the high magnetic moment material on said first pole comprises depositing at least one lamina of the high magnetic moment material and at least one lamina of a non-magnetic, dielectric material.

2. The method of claim 1, further comprising:

depositing the mask at an end of said second pole;

performing a second ion milling process to remove a portion of said second pole at said end;

performing a reactive ion etching process to remove a portion of said dielectric write gap material layer; and performing a third ion milling process to remove a material from said pedestal.

3. The method of claim 1, further comprising, following depositing the first insulation layer, polishing said first insulation layer using a chemical mechanical polishing process.

4. The method of claim 1 wherein plating the second pole magnetic material comprises plating a Ni—Fe alloy.

5. The method of claim 1 wherein plating the second pole magnetic material comprises plating to a material thickness about 2 um.

6. The method of claim 1 wherein forming the thin layer of high magnetic moment material comprises sputter depositing Rh.

7. The method of claim 1 wherein forming the thin layer of high magnetic moment material comprises sputter depositing Ta.

8. The method of claim 1 wherein forming the thin layer of high magnetic moment material comprises sputter depositing Al.

9. The method of claim 1 wherein forming the thin layer of high magnetic moment material comprises sputter depositing Ti.

10. The method of claim 1 wherein forming the thin layer of high magnetic moment material comprises sputter depositing Zr.

11. The method of claim 1 wherein forming the thin layer of high magnetic moment material comprises depositing the lamina of a high magnetic moment material and a lamina of $CO_{90}Zr_9Cr$.

12. The method of claim 1 wherein forming the high magnetic moment material onto the first pole comprises sputter depositing FeXN, X being selected from the group of materials consisting of Rh, Ta, Al, Ti, and Zr.

13. The method of claim 12 wherein forming the high magnetic moment material onto the first pole comprises sputter depositing a lamina of FeXN, and further comprises depositing a lamina of a cobalt based ferromagnetic amorphous alloy.

14. The method of claim 12 wherein forming the high magnetic moment material onto the first pole further comprises depositing a lamina of $Co_{90}Zr_9Cr$.

15. The method of claim 12 wherein forming the high magnetic moment material onto the first pole comprises depositing Rh.

16. The method of claim 12 wherein forming the high magnetic moment material onto the first pole comprises depositing Ta.

17. The method of claim 12 wherein forming the high magnetic moment material onto the first pole comprises depositing Al.

18. The method of claim 12 wherein forming the high magnetic moment material onto the first pole comprises depositing Ti.

19. The method of claim 12 wherein forming the high magnetic moment material onto the first pole comprises depositing Zr.

20. A method for constructing an inductive write structure for use in a magnetic data recording system, comprising:

forming a first magnetic pole of a magnetic material;

depositing a first insulation layer;

depositing a layer of dielectric write gap material;

forming an electrically conductive coil;

depositing a second insulation layer;

curing said second insulation layer;

forming a thin layer of high magnetic moment material, by sputter depositing a lamina of FeXN, X being selected from the group of materials consisting of Rh, Ta, Al, Ti, and Zr, and sputter depositing a lamina of a cobalt based ferromagnetic amorphous alloy;

masking the thin layer of high magnetic moment material in a pattern corresponding to a second pole;

plating a magnetic material in the pattern of said second pole;

performing a first ion milling process, to remove at least a portion of the sputtered, high magnetic moment material not covered by the plated second pole;

after forming the first magnetic pole:

forming a layer of a high magnetic moment material onto said first pole;

masking the high magnetic moment material formed onto the first pole in a pattern corresponding to a pedestal to be formed on an end of the first pole; and etching to remove said sputter deposited high magnetic moment material not covered by said mask to form said pedestal;

depositing the mask at an end of said second pole;

performing a second ion milling process to remove a portion of said second pole at said end;

performing a reactive ion etching process to remove a portion of said dielectric write gap material layer; and performing a third ion milling process to remove a material from said pedestal.

* * * * *